(12) United States Patent
Matsuo et al.

(10) Patent No.: US 8,380,208 B2
(45) Date of Patent: Feb. 19, 2013

(54) TERMINAL DEVICE, WIRELESS COMMUNICATION SYSTEM, AND WIRELESS COMMUNICATION METHOD

(75) Inventors: Hidenori Matsuo, Kanagawa (JP); Takahisa Aoyama, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/378,634

(22) PCT Filed: Jun. 15, 2010

(86) PCT No.: PCT/JP2010/003958
§ 371 (c)(1), (2), (4) Date: Dec. 15, 2011

(87) PCT Pub. No.: WO2010/150481
PCT Pub. Date: Dec. 29, 2010

(65) Prior Publication Data
US 2012/0088508 A1    Apr. 12, 2012

(30) Foreign Application Priority Data

Jun. 22, 2009 (JP) .................................. 2009-147517

(51) Int. Cl.
*H04W 36/00* (2009.01)
(52) U.S. Cl. ........................................................ 455/444
(58) Field of Classification Search ........... 455/436–448
See application file for complete search history.

(56) References Cited

U.S. PATENT DOCUMENTS

2004/0029588 A1* 2/2004 Kikuma et al. ............... 455/436
2008/0318576 A1* 12/2008 So et al. ....................... 455/436
2011/0151867 A1 6/2011 Hirano
2011/0206011 A1 8/2011 Ishida

FOREIGN PATENT DOCUMENTS

| JP | 2010/109664 | 5/2010 |
|---|---|---|
| WO | 2008/134281 | 11/2008 |
| WO | 2010/032351 | 3/2010 |
| WO | 2010/050140 | 5/2010 |

OTHER PUBLICATIONS

International Search Report dated Aug. 17, 2010.
3GPP TSG-RAN WG2 Meeting #63, "Way forward for handover to HeNB," Telecom Italia, AT&T, Qualcomm Europe, Samsung, R2-084736, Aug. 18-22, 2008, pp. 1-2.

* cited by examiner

*Primary Examiner* — Temica M Beamer
*Assistant Examiner* — Joel Ajayi
(74) *Attorney, Agent, or Firm* — Dickinson Wright PLLC

(57) ABSTRACT

A terminal device (1) is provided with: a trigger judging section (6) judging whether an event trigger for performing handover from a macrocell to a CSG cell has occurred or not; a first measurement result reporting section (7) transmitting a first measurement result report which includes the PCI of a CSG cell for which an event trigger has occurred, to an eNB; a CGI detecting section (9) detecting the CGI of the CSG cell for which the event trigger has occurred, on the basis of measurement setting information transmitted from the eNB; and a second measurement result reporting section (10) transmitting a second measurement result report which includes the detected CGI, to the eNB. When event triggers have continuously occurred, a report transmission controlling section (13) controls transmission of the measurement result reports on the basis of the reception qualities of the CSG cells to reduce the frequency of transmission of the measurement result reports. Thereby, it is possible to control waste of wireless resources and prevent communication interruption from frequently occurring.

9 Claims, 15 Drawing Sheets

TERMINAL DEVICE, WIRELESS COMMUNICATION SYSTEM, AND WIRELESS COMMUNICATION METHOD

TECHNICAL FIELD

The present invention relates to a terminal device used in a wireless communication system, and in particular to a technique for handover from a macrocell to a CSG cell.

BACKGROUND ART

Recently, it has been examined by the 3GPP to construct a small cell (a CSG cell) by installing an indoor home base station (HeNB) in a cell (a macrocell) constructed by an ordinary base station (eNB) (see FIG. 11). The HeNB has a function of restricting terminal devices (UEs) which can access the HeNB, and a terminal device can connect to only an HeNB that it is permitted to access. Therefore, even if detecting an HeNB with a good reception quality, the terminal device cannot connect to the HeNB if the terminal is not permitted to access the HeNB (except for the case of emergency).

In order for the terminal device to obtain permission to access an HeNB, the terminal device needs to confirm cell identification information (a cell ID) included in notification information transmitted from the HeNB first. Each CSG cell has a group ID called a CSG ID, which is given to each group of CSG cells, and access permission to each group is given to the terminal device. As this cell ID, there are, for example, a physical cell ID (PCI) locally identifying a base station, a cell global ID (CGI) capable of uniquely identifying a base station among all base stations. The terminal device compares a list of accessible HeNB group IDs (an access permission list) notified from a network with a received cell ID in the notification information. If the detected cell ID of the HeNB is included in the access permission list, the HeNB is judged to be accessible.

As shown in FIG. 11, HeNBs are connected to a gateway apparatus for HeNBs (HeNB GW) and a mobility management apparatus (MME), and these apparatuses perform securement of network resources and management of NAS messages (such as position registration messages). Since the information of the access permission list is information about individual terminals, the HeNBs (assumed to be owned by individual households) do not have the information of the access permission list from the viewpoint of security. On the other hand, the MME can have the information of the access permission list because it is managed by an operator.

As described above, all CSG cells have cell identification information called a physical ID (PCI). However, there are not so many cells that can be identified by a PCI. Therefore, as shown in FIG. 12, there is a case where another CSG cell having the same PCI exists in one macrocell (a serving cell currently connected by the terminal device).

The terminal device measures the reception quality of a signal from a neighboring CSG cell. If the reception quality clears a predetermined condition (for example, in the case where the reception quality of the CSG cell is higher than the reception quality of the serving cell), a trigger for performing handover to the CSG cell (also called an event trigger) is caused. When this event trigger is caused, the terminal device notifies information about the CSG with a good reception quality (information about the reception quality and a PCI) to the eNB of the serving cell using a measurement result report. The eNB of the serving cell determines the handover destination CSG cell on the basis of the notified information (the information about the reception quality and the PCI) and transmits a handover request to the HeNB of the handover destination. In this case, however, if the above-stated PCI collision occurs, there is a possibility that the eNB of the serving cell transmits the handover request to the HeNB of a wrong CSG cell (this is called PCI confusion) as shown in FIG. 12.

For example, in FIG. 12, a terminal device measures the reception quality of the CSG cell on the left side of the figure and transmits a measurement result report to the eNB of the serving cell on the assumption of handover to this CSG cell (a target cell). However, the eNB wrongly sends a handover request to the HeNB of another CSG cell having the same PCI (the CSG cell on the right side of the figure). As a result, the terminal device fails in handover to the target cell (the CSG cell on the left side of the figure).

As a measure for such PCI confusion, there has been conventionally proposed a method in which a CGI (in addition to a PCI) is used as the cell identification information, for example, a method in which a CGI detected from notification information about a CSG cell is notified to a serving cell with the use of a measurement result report to uniquely identify the CSG cell. However, it takes more time to detect a CGI (in comparison with a PCI). Therefore, a terminal device notifies a PCI and a reception quality to a serving cell by a first measurement result report first, and, after detection of a CGI, notifies the CGI to the serving cell by a second measurement result report (for example, see Non Patent Literature 1).

Specifically, as shown in FIG. 13, the terminal device measures the reception qualities of surrounding CSG cells (S100). When finding CSG cells with a good reception quality (when an event trigger occurs) (S101), the terminal device notifies the PCIs and measured reception qualities of the CSG cells with a good reception quality, to the eNB using a first measurement result report first (S102). The eNB of the serving cell selects one handover destination candidate CSG cell from the first measurement result report received from the terminal device, and transmits measurement setting information which includes setting information required to detect the CGI of the CSG cell, to the terminal device (S103). The terminal device interrupts reception from the serving cell on the basis of information (information for interrupting data transmission such as a gap and DRX) included in the measurement setting information received from the serving cell, and detects the CGI of the CSG cell specified as a target cell (S104), and notifies the detected CGI to the serving cell using a second measurement result report (S105).

However, in the conventional method, settings for a gap (a period during which data is not transmitted/received), DRX (discontinuous reception) and the like are made by the terminal device on the basis of the measurement setting information at the time of detecting a CGI, and data transmission from the serving cell to the terminal device is interrupted (thereby, the terminal device can detect the CGIs of surrounding CSG cells). Therefore, if CGI detection is frequently performed, interruption of communication between the serving cell and the terminal device and decrease of throughput are caused (though, if frequency of CGI detection is low, it does not matter much).

Especially, HeNBs assumed to be installed in households are often arranged freely to some extent (in comparison with an eNB arranged by an operator in consideration of an installation place). For example, multiple HeNBs may be adjacently arranged near the cell edge of a macrocell (see FIG. 14). If a terminal device passes through such an area, the reception quality of the macrocell is low (because the terminal device is located at the cell edge of the macrocell), and there is a strong possibility that an event trigger for a nearby CSG cell occurs. Furthermore, in this case, since the multiple HeNBs are adjacently arranged, there is a possibility that an event trigger for another CSG cell is caused only by the terminal device moving a little. That is, in such a case, there is a possibility that event triggers for the multiple CSG cells continuously occur.

For example, it is assumed that three CSG cells exist around a terminal device located at a macrocell edge, and event triggers for these three CSG cells continuously occur (see FIG. 14). In this case, as shown in FIG. 15, when an event trigger for the first CSG cell (CSG1) occurs (S110), the terminal device notifies the PCI and reception quality of the CSG cell (CSG1) to the eNB by a first measurement result report (S111). When receiving this first measurement result report, the eNB returns measurement setting information for detecting the CGI of the CSG cell (CSG1) to the terminal device (S112).

Next, when an event trigger for the second CSG cell (CSG2) occurs (S113), the terminal device notifies the PCI and reception quality of the CSG cell (CSG2) to the eNB by a first measurement result report (S114). When receiving this first measurement result report, the eNB returns measurement setting information for detecting the CGI of the CSG cell (CSG2) to the terminal device (S115).

Furthermore, when an event trigger for the third CSG cell (CSG3) occurs (S116), the terminal device notifies the PCI and reception quality of the CSG cell (CSG3) to the eNB by a first measurement result report (S117). When receiving this first measurement result report, the eNB returns measurement setting information for detecting the CGI of the CSG cell (CSG3) to the terminal device (S118).

Then, first, on the basis of the measurement setting information for the first CSG cell (CSG1), the terminal device detects the CGI of the CSG cell (CSG1) (S119), and notifies the detected CGI to the serving cell using a second measurement result report (S120). Next, on the basis of the measurement setting information for the second CSG cell (CSG2), the terminal device detects the CGI of the CSG cell (CSG2) (S121), and notifies the detected CGI to the serving cell using a second measurement result report (S122). The same goes for the third CSG cell (CSG cell 3).

As described above, when event triggers for multiple CSG cells continuously occur, measurement result reports are frequently transmitted from a terminal device to an eNB, and wireless resources are wasted. Furthermore, if CGI detection is frequently performed, communication is frequently interrupted.

CITATION LIST

Non Patent Literature

Non Patent Literature 1: 3GPP TSG-RAN WG2 meeting #63 (written contribution) R2-084736 "Way forward for handover to HeNB"

SUMMARY OF INVENTION

Technical Problem

The present invention has been made under the background described above. The object of the present invention is to provide a terminal device capable of controlling waste of wireless resources and preventing communication interruption from frequently occurring even if handover event triggers have continuously occurred.

Solution to Problem

An aspect of the present invention is a terminal device, and this terminal device is configured to be provided with: a trigger judging section judging, on the basis of a result of comparison between a reception quality of a macrocell and a reception quality of a small cell in the macrocell, whether an event trigger for performing handover from the macrocell to the small cell has occurred or not; a first measurement result reporting section transmitting a first measurement result report which includes a physical cell ID indicating a small cell for which the event trigger has occurred, to a base station of the macrocell; a proper cell ID detecting section detecting a proper cell ID for uniquely identifying the small cell for which the event trigger has occurred, on the basis of measurement setting information transmitted from the base station of the macrocell as a response to the first measurement result report; a second measurement result reporting section transmitting a second measurement result report which includes the detected proper cell ID, to the base station of the macrocell; and a report transmission controlling section controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred.

Another aspect of the present invention is a wireless communication system, and this wireless communication system is a wireless communication system comprising a terminal device possessed by a user and a base station apparatus installed in a base station of a macrocell, wherein the terminal device is configured to be provided with: a trigger judging section judging, on the basis of a result of comparison between a reception quality of the macrocell and a reception quality of a small cell in the macrocell, whether an event trigger for performing handover from the macrocell to the small cell has occurred or not; a first measurement result reporting section transmitting a first measurement result report which includes a physical cell ID indicating a small cell for which the event trigger has occurred, to a base station apparatus of the macrocell; a proper cell ID detecting section detecting a proper cell ID for uniquely identifying the small cell for which the event trigger has occurred, on the basis of measurement setting information transmitted from the base station apparatus of the macrocell as a response to the first measurement result report; a second measurement result reporting section transmitting a second measurement result report which includes the detected proper cell ID, to the base station apparatus of the macrocell; and a report transmission controlling section controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred.

Another aspect of the present invention is a wireless communication method, and the wireless communication system includes: judging, on the basis of a result of comparison between a reception quality of a macrocell and a reception quality of a small cell in the macrocell, whether an event trigger for performing handover from the macrocell to the small cell has occurred or not; transmitting a first measurement result report which includes a physical cell ID indicating a small cell for which the event trigger has occurred, to a base station of the macrocell; detecting a proper cell ID for uniquely identifying the small cell for which the event trigger has occurred, on the basis of measurement setting information transmitted from the base station of the macrocell as a response to the first measurement result report; transmitting a second measurement result report which includes the detected proper cell ID, to the base station of the macrocell; and controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred.

The present invention is capable of preventing measurement result reports from being frequently transmitted from a terminal device to the base station of a macrocell, controlling waste of wireless resources, preventing detection of a proper cell ID from being frequently performed and preventing communication interruption from frequently occurring.

As described below, other aspects of the present invention exist. Therefore, this disclosure of invention intends to provide a part of aspects of the present invention and does not intend to restrict the scope of the present invention described and claimed here.

DESCRIPTION OF EMBODIMENTS

The present invention will be described below in detail. However, the detailed description below and accompanying drawings do not limit the invention.

A terminal device of embodiments of the present invention will be described below with the use of drawings. In the present embodiments, a terminal device used in a wireless communication system (for example, a mobile phone, a PDA and the like) will be described as an example.

First Embodiment

Figure 1:
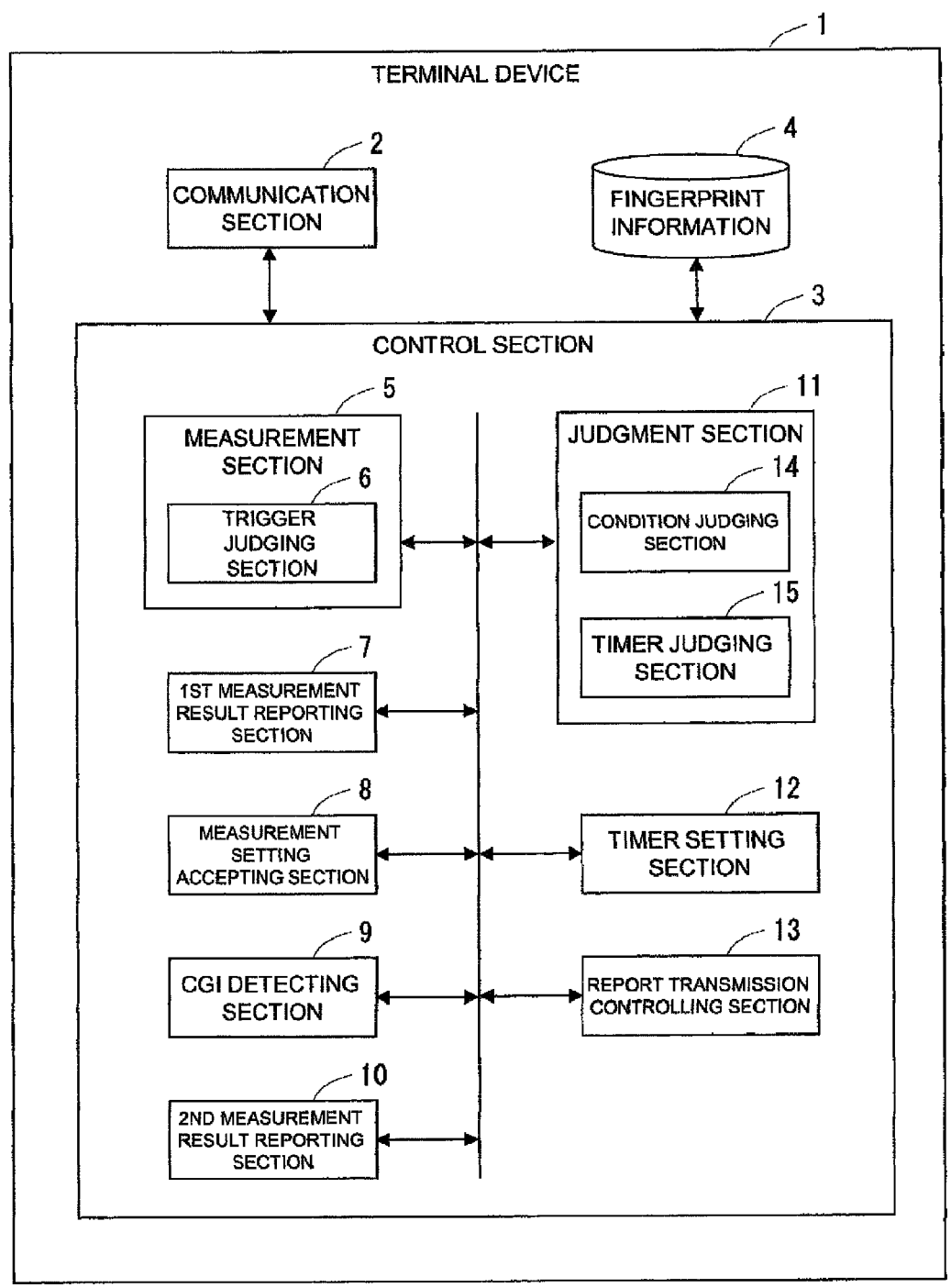
FIG. 1 is a block diagram showing the configuration of a terminal device in a first embodiment of the present invention.
Figure 2:
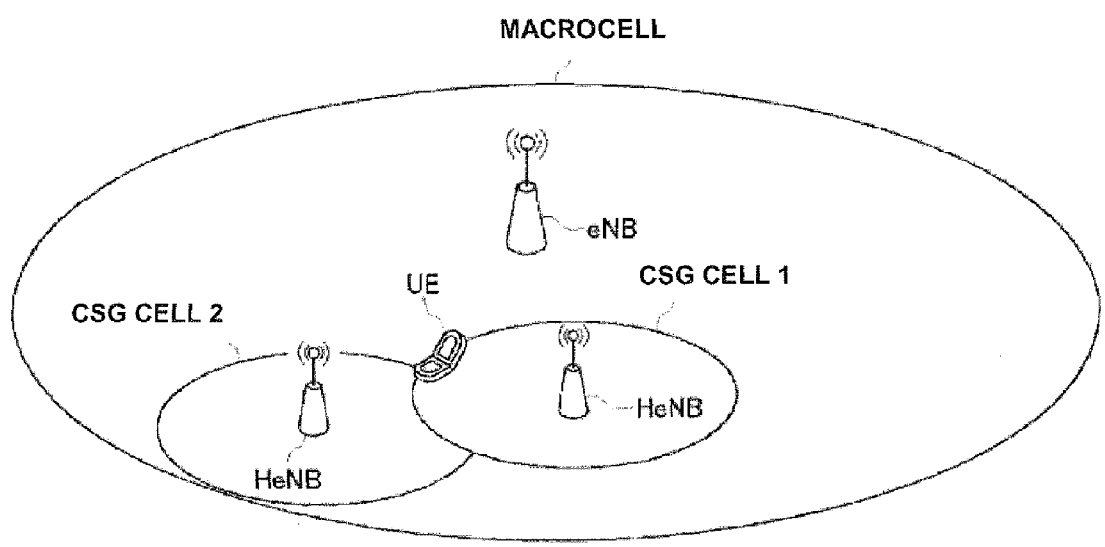
FIG. 2 is a diagram showing an example of arrangement of the terminal device, a macrocell base station and CSG cell base stations in a wireless communication system.

The configuration of a terminal device of a first embodiment of the present invention will be described with reference to drawings. FIG. 1 is a block diagram showing the configuration of the terminal device of this embodiment, and FIG. 2 is a diagram showing an example of arrangement of the terminal device, a macrocell base station and CSG cell base stations in a wireless communication system.

Here, the cell arrangement of this embodiment will be described first with reference to FIG. 2. As shown in FIG. 2, the wireless communication system of this embodiment is provided with a terminal apparatus (UE), a macrocell base station (eNB) constructing a macrocell and home base stations (HeNBs) constructing CSG cells installed in the macrocell. In the example in FIG. 2, there is shown a case where two CSG cells exist around the terminal device located at a macrocell edge. Here, the CSG cell corresponds to a small cell of the present invention. Though FIG. 2 shows a case where there are two CSG cells for convenience of explanation, the scope of the present invention is not limited thereto.

Next, the configuration of the terminal device of this embodiment will be described with reference to FIG. 1. A terminal device 1 of this embodiment has a function of judging whether a CSG cell for which an event trigger has occurred is accessible or not with the use of cell information (fingerprint information) which the terminal device 1 detected in the past and changing a method of transmitting a measurement result report according to a result of the judgment.

As shown in FIG. 1, the terminal device 1 (UE) is provided with a communication section 2 for communicating with a base station apparatus installed in the macrocell base station (eNB), a control section 3 for controlling handover from the macrocell to a CSG cell, and a fingerprint information storing section 4 for holding fingerprint information (cell information detected in the past). This fingerprint information includes, for example, as cell information about CSG cells which the terminal device 1 has detected in the past, identification information about the CSG cells (PCI or CGI) and information about accessibility of the CSG cells (information about whether access by the terminal device 1 is permitted or not). Therefore, this fingerprint information storing section 4 corresponds to a cell information storing section of the present invention.

The control section 3 is provided with a measurement section 5 which measures the reception quality of a signal from the macrocell base station (eNB) and the reception qualities of signals from the CSG cell base stations (HeNBs). This measurement section 5 is provided with a trigger judging section 6 which judges whether an event trigger for performing handover from the macrocell to a CSG cell has occurred or not on the basis of a result of comparison between the reception quality of the macrocell and the reception quality of the CSG cell. For example, if the reception quality of the CSG cell is higher than the reception quality of the macrocell, the trigger judging section 6 judges that an event trigger for performing handover to the CSG cell has occurred.

The control section 3 is also provided with a first measurement result reporting section 7 which transmits a first measurement result report including the PCI of a CSG cell for which an event trigger has occurred, to the macrocell base station, a measurement setting accepting section 8 which accepts measurement setting information transmitted from the macrocell base station as a response to the first measurement result report, a CGI detecting section 9 which detects the CGI of the CSG cell for which the event trigger has occurred, on the basis of the measurement setting information, and a second measurement result reporting section 10 which transmits a second measurement result report including the CGI, to the macrocell base station. The first measurement result reporting section 7 and the second measurement result reporting section 10 may be integrated as one measurement result reporting section.

The control section 3 is also provided with a judgment section 11, a timer setting section 12 and a report transmission controlling section 13 as components for performing measurement result report transmission control (to be described later) when event triggers have continuously occurred.

The judgment section 11 is provided with a condition judging section 14 which judges whether a predetermined condition to be a criteria at the time of performing the measurement result report transmission control is satisfied or not on the basis of the reception quality of a CSG cell for which an event trigger has occurred and finger print information (information about whether the CSG cell is accessible or not). Specifically, the condition judging section 14 judges, for CSG cells for which event triggers have continuously occurred, whether a condition 1-1 that "a CSG cell for which an event trigger has occurred earlier (referred to as a first CSG cell) is accessible or its accessibility is unknown, a CSG cell for which an event trigger has occurred later (referred to as a second CSG cell) is accessible, and the reception quality of the second CSG cell is higher than the reception quality of the first CSG cell" and a condition 1-2 that "the first CSG cell is inaccessible, and the second CSG cell is accessible" are satisfied or not.

If it is judged that any of the above conditions 1-1 and 1-2 is satisfied, the report transmission controlling section 13 performs measurement result report transmission control so as to cancel transmission of a second measurement result report of the first CSG cell and prioritize transmission of a second measurement result report of the second CSG cell.

If it is judged that neither of the above conditions 1-1 and 1-2 is satisfied, the report transmission controlling section 13 performs measurement result report transmission control so as to delay transmission of a first measurement result report of the second CSG cell and transmit the second measurement result report of the first CSG cell and the first measurement result report of the second CSG cell together.

The case where it is judged that neither of the above conditions 1-1 and 1-2 is satisfied is, for example, "a case where the first CSG cell is accessible or its accessibility is unknown, the second CSG cell is accessible, and the reception quality of the second CSG cell is lower than the reception quality of the first CSG cell", "a case where the first CSG cell is accessible or its accessibility is unknown, and the second CSG cell is inaccessible or its accessibility is unknown", "a case where the first CSG cell is inaccessible, and the second CSG cell is inaccessible or its accessibility is unknown", and the like.

The judgment section 11 is also provided with a timer judging section 15 which judges, if event triggers have continuously occurred, whether timer time set when the earliest event trigger occurred has elapsed or not. The timer setting section 12 is equipped with a function of setting timer time according to the reception quality of the macrocell. For example, the timer setting section 12 sets the timer time infinite (it can be said that the timer time is not set) if the reception quality of the macrocell is higher than a predetermined threshold, and sets the timer time to time notified from the macrocell base station (finite timer time) if the reception quality of the macrocell is lower than the predetermined threshold. The timer time, the threshold and the like may be notified to multiple terminal devices 1 individually from the macrocell base station with the use of measurement setting information or may be simultaneously notified with the use of notification information.

Even if it is judged that any of the above conditions 1-1 and 1-2 is satisfied, the notification transmission controlling section prevents transmission of the second measurement result report of the first CSG cell from being cancelled after the timer time elapses. That is, it can also be said that the notification transmission controlling section can cancel transmission of the second measurement result report of the first CSG cell before the timer time set when the earliest event trigger occurred elapses.

The operation of the terminal device 1 configured as, described above will be described with reference to drawings.

Description will be made below mainly on the measurement result report transmission control which is a characteristic operation of the present invention. Here, the description will be made on the assumption that two CSG cells exist around the terminal device 1 located at a macrocell edge, and event triggers for these two CSG cells have continuously occurred (see FIG. 2).

Figure 3:
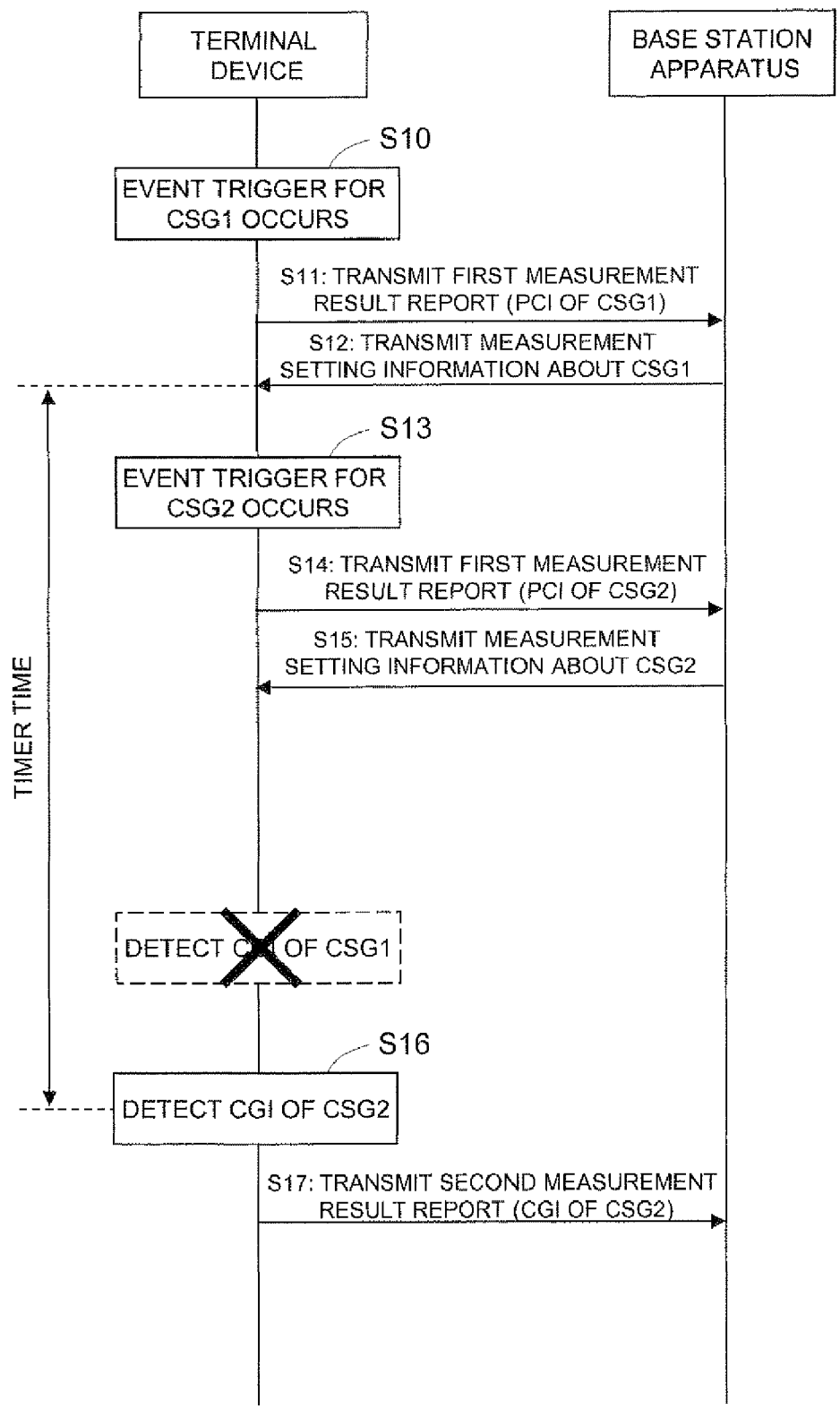
FIG. 3 is a sequence diagram of control to prioritize transmission of a second measurement result report of a second CSG cell.

First, the flow of the operation of the whole system will be described with reference to the sequence diagrams in FIGS. 3 and 4. FIG. 3 is a sequence diagram showing the flow of the operation of the whole system in the case where it is judged that any of the above conditions 1-1 and 1-2 is satisfied. As shown in FIG. 3, when an event trigger for the first CSG cell (CSG1) occurs (S10), the terminal device 1 notifies the PCI and reception quality of the CSG cell (CSG1) to the eNB by a first measurement result report (S11). When receiving this first measurement result report, the eNB returns measurement setting information for detecting the CGI of the CSG cell (CSG1) to the terminal device 1 (S12). If it is judged that any of the conditions 1-1 and 1-2 is satisfied, timer time is set then.

Next, when an event trigger for the second CSG cell (CSG2) occurs (S13), the terminal device 1 notifies the PCI and reception quality of the CSG cell (CSG2) to the eNB by a first measurement result report (S14). When receiving this first measurement result report, the eNB returns measurement setting information for detecting the CGI of the CSG cell (CSG2) to the terminal device 1 (S15).

Then, if it is judged that any of the conditions 1-1 and 1-2 is satisfied, the terminal device 1 cancels detection of the CGI of the first CSG cell (CSG1) (cancels reporting of the detected CGI to the eNB by a second measurement result report), detects the CGI of the second CSG cell (CSG2) (S16), and notifies the detected CGI to the eNB using the second measurement result report (S17). After the timer time elapses, transmission of the second measurement result report of the first CSG cell (CSG1) is not cancelled.

Figure 4:
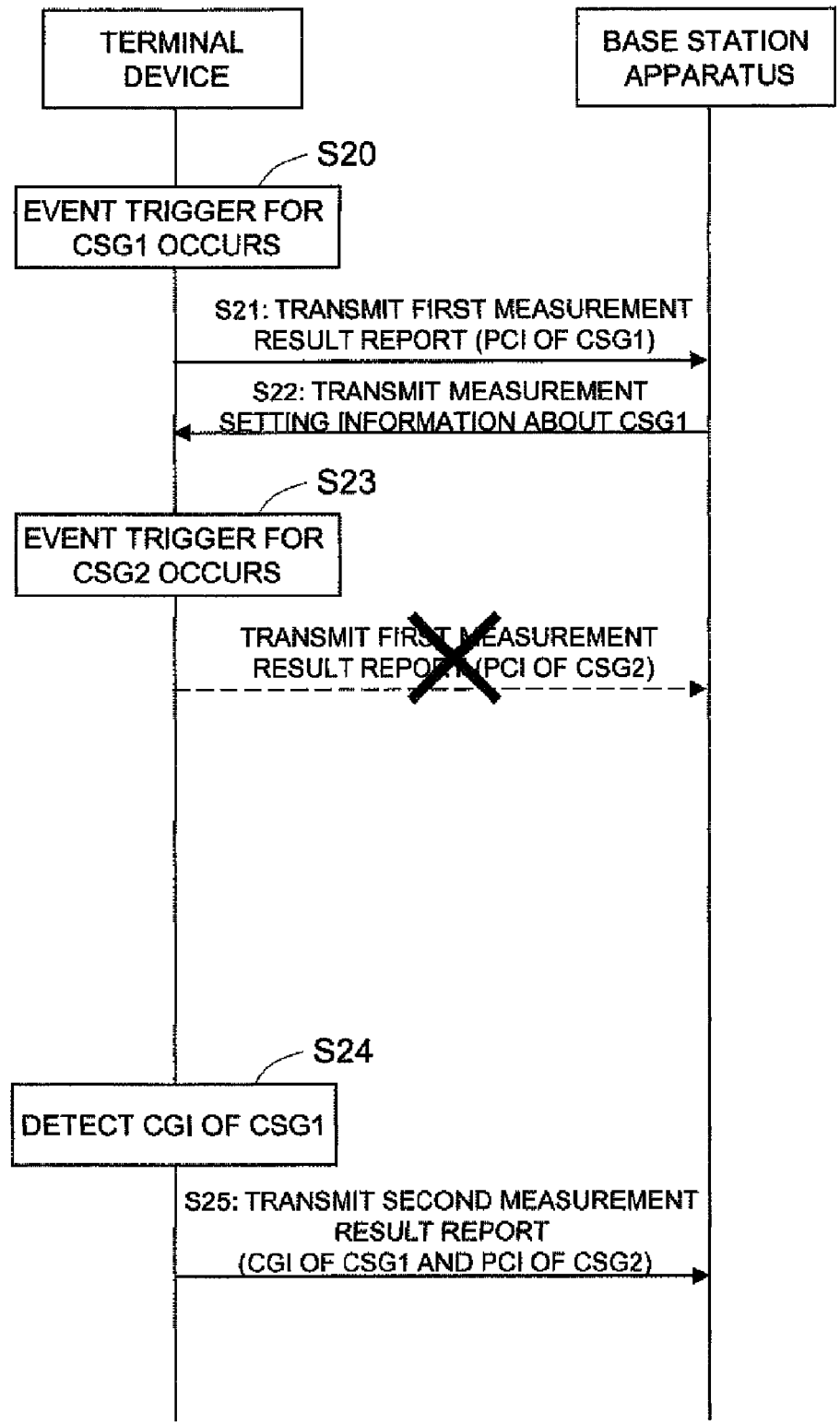
FIG. 4 is a sequence diagram of control to delay transmission of a first measurement result report of the second CSG cell.

FIG. 4 is a sequence diagram showing the flow of the operation of the whole system in the case where it is judged that neither of the above conditions 1-1 and 1-2 is satisfied. As shown in FIG. 4, when an event trigger for the first CSG cell (CSG1) occurs (S20), the terminal device 1 notifies the PCI and reception quality of the CSG cell (CSG1) to the eNB by a first measurement result report first (S21). When receiving this first measurement result report, the eNB returns measurement setting information for detecting the CGI of the CSG cell (CSG1) to the terminal device 1 (S22).

In the case where it is judged that neither of the conditions 1-1 and 1-2 is satisfied, when an event trigger for the second CSG cell (CSG2) occurs (S23), the terminal device 1 delays notification of the PCI and reception quality of the CSG cell (CSG2) to the eNB by a first measurement result report. Then, the terminal device 1 detects the CGI of the first CSG cell (CSG1) (S24) and notifies the detected CGI of the CSG1 and the PCI of the CSG2 to the eNB using a second measurement result report (S25).

Figure 5:
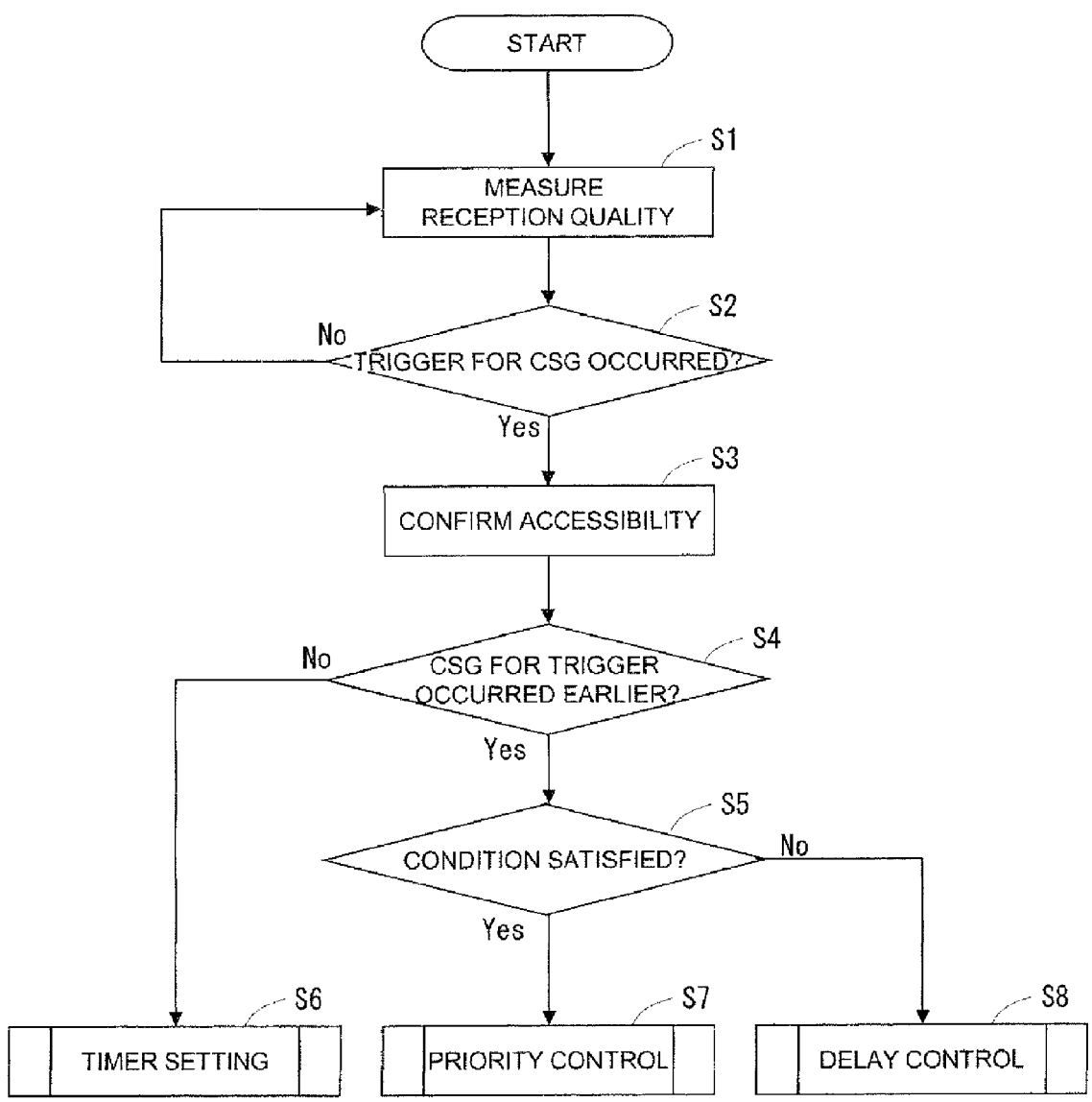
FIG. 5 is a flowchart showing the flow of the whole process of the terminal device in the first embodiment of the present invention.

Next, the flow of a process of the terminal device 1 will be described with reference to flow diagrams of FIGS. 5 to 8. FIG. 5 is a flowchart showing the whole flow of the process of the terminal device 1. As shown in FIG. 5, the terminal device 1 measures the reception quality of the macrocell and the reception qualities of surrounding CSG cells (S1) and judges whether event triggers for handover to the CSG cells have occurred or not, on the basis of a result of comparison between the reception qualities (S2).

If it is judged that an event trigger for a CSG cell has occurred, it is confirmed whether access to the CSG cell is permitted or not with the use of fingerprint information (S3). Next, it is judged whether or not there is a CSG cell for which an event trigger has occurred earlier (S4). If an event trigger has occurred earlier, it is judged whether the above conditions 1-1 or 1-2 is satisfied or not (S5).

If an event trigger has not occurred earlier, a timer setting process is performed (S6). If it is judged that any of the conditions 1-1 and 1-2 is satisfied, control to prioritize transmission of a second measurement result report of the CSG cell (CSG2) for which the event trigger has occurred later is performed (S7). On the other hand, if it is judged that neither of the conditions 1-1 and 1-2 is satisfied, control to delay transmission of a first measurement result report of the CSG cell (CSG2) for which the event trigger has occurred later is performed (S8).

Figure 6:
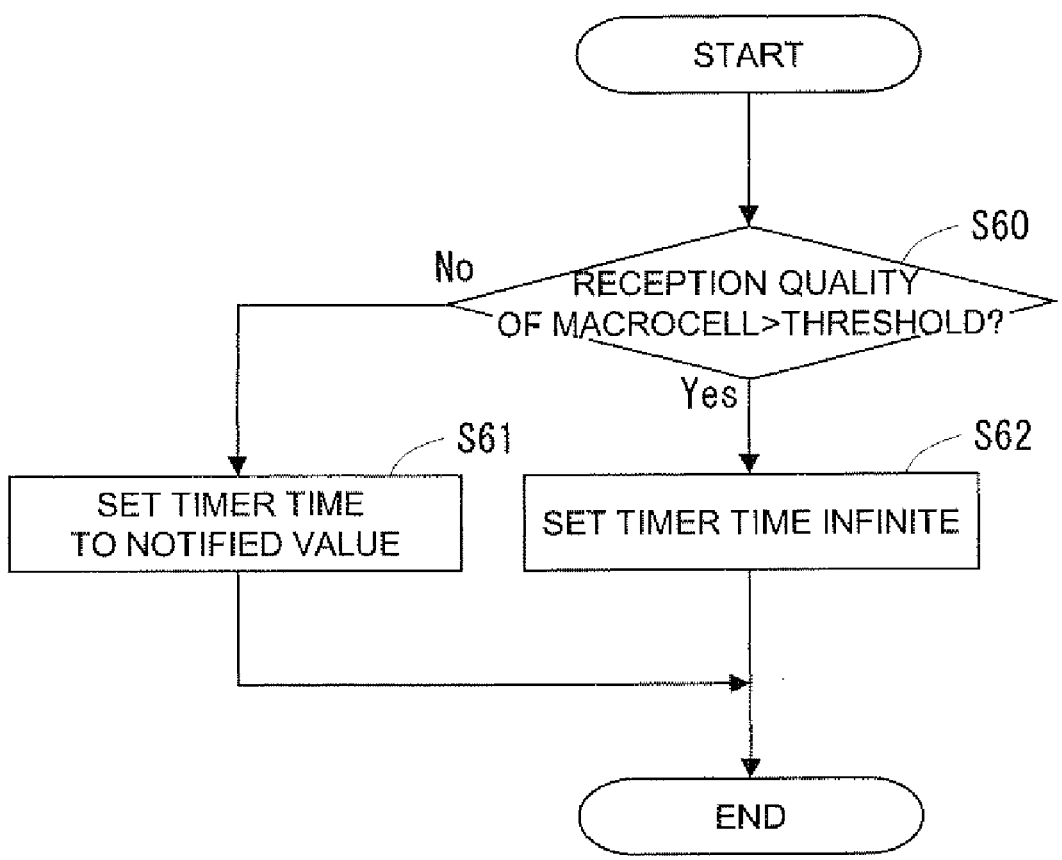
FIG. 6 is a flowchart showing the flow of a timer setting operation.

FIG. 6 is a flowchart showing the flow of the timer setting process. As shown in FIG. 6, it is judged whether or not the reception quality of the macrocell is higher than a predetermined threshold (S60). If the reception quality of the macrocell is lower, the timer time is set to a value notified from the macrocell base station (eNB) (S61). On the other hand, if it is judged that the reception quality of the macrocell is higher, the timer time is set to be infinite (S62).

Figure 7:
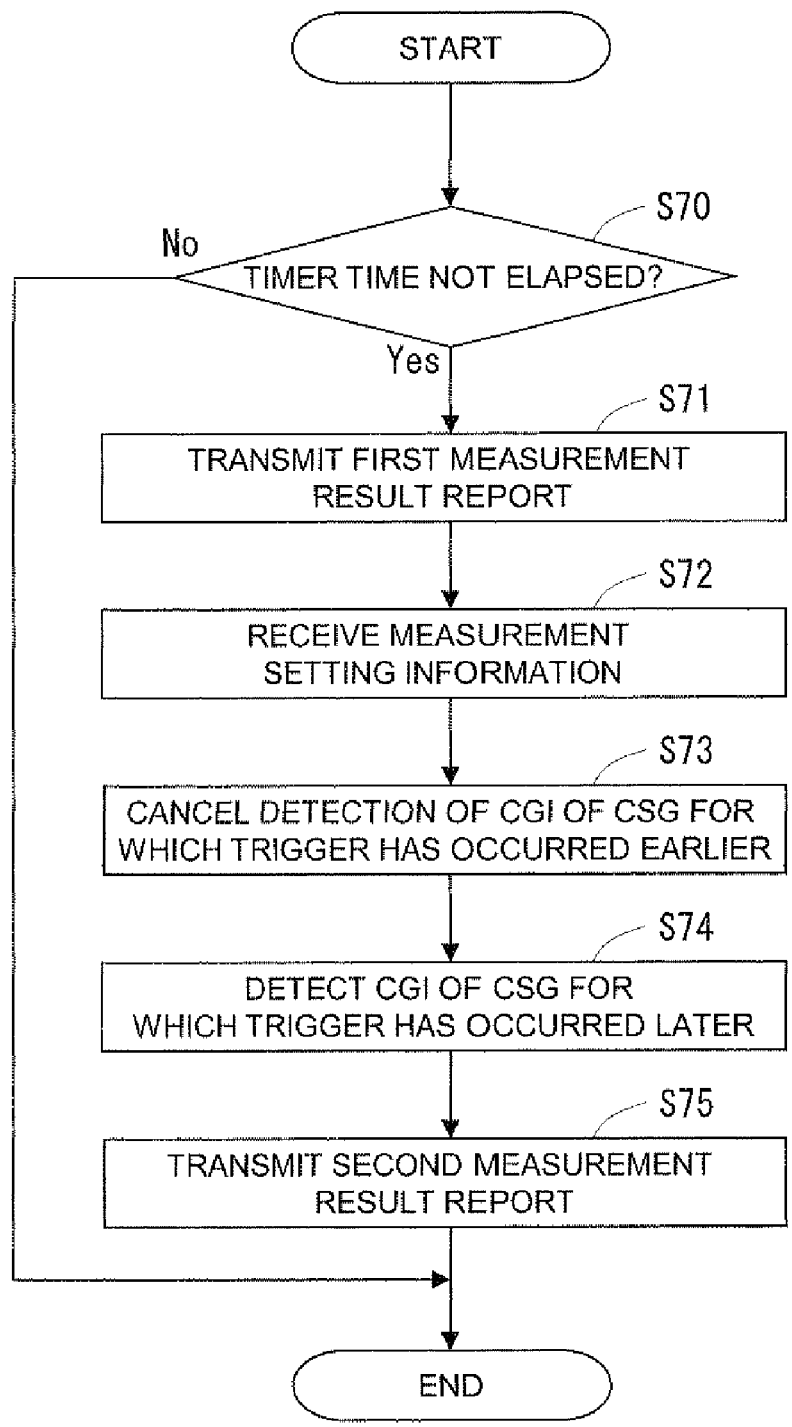
FIG. 7 is a flowchart showing the flow of control to prioritize transmission of the second measurement result report.

FIG. 7 is a flowchart showing the flow of control to prioritize transmission of a second measurement result report. As shown in FIG. 7, it is judged whether the timer time has elapsed or not first (S70). If it is judged the timer time has not elapsed, the PCI and reception quality of a CSG cell (CSG2) is transmitted to the eNB of the serving cell by a first measurement result report (S71), and measurement setting information is received from the eNB as a response thereto (S72). Then, detection of the CGI of a CSG cell (CSG1) for which a trigger has occurred earlier is cancelled (S73), and the CGI of the CSG cell (CSG2) for which a trigger has occurred later is detected (S74). The detected CGI is transmitted to the eNB of the serving cell by the second measurement result report (S75).

Figure 8:
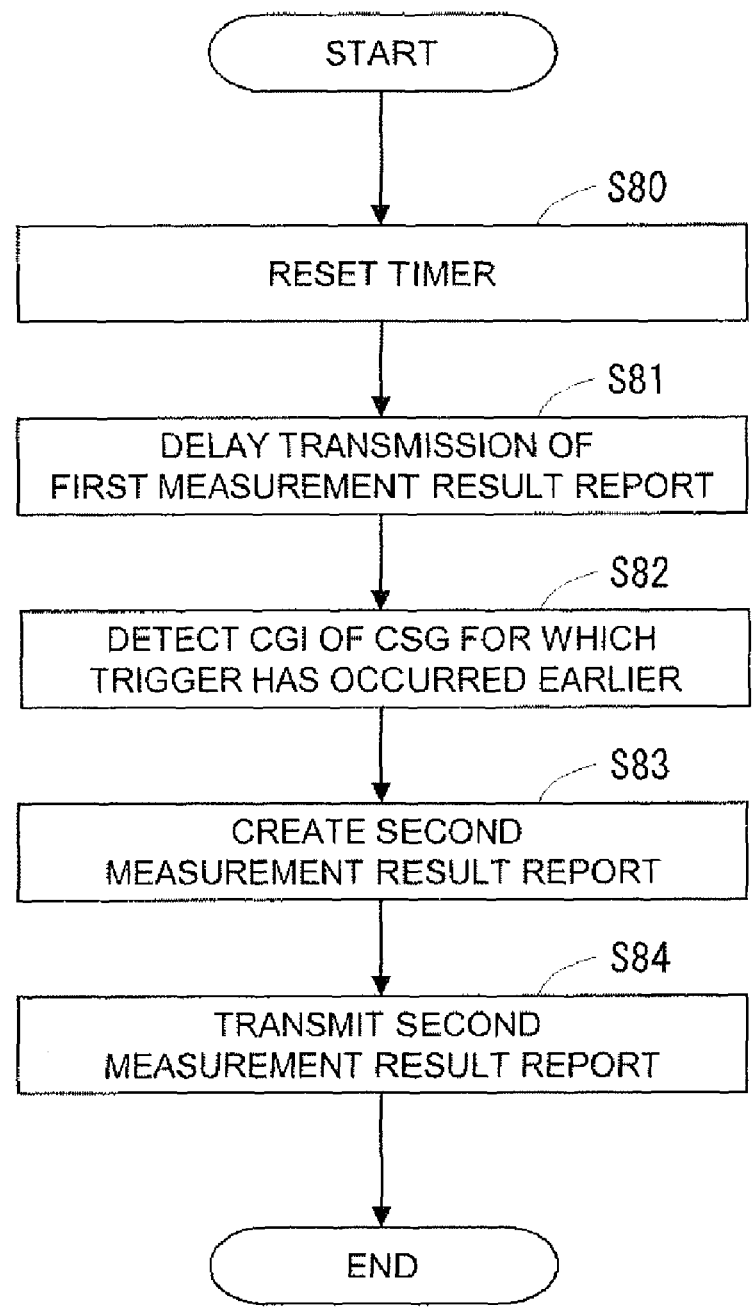
FIG. 8 is a flowchart showing the flow of control to delay transmission of the first measurement result report.

FIG. 8 is a flowchart showing the flow of control to delay transmission of a first measurement result report. As shown in FIG. 8, the terminal device 1 resets the timer set at step 6 first (S80). Next, the terminal device 1 delays transmission of the first measurement result report of a CSG cell (CSG2) for which an event trigger has occurred later (S81) and detects the CGI of a CSG cell (CSG1) for which an event trigger has occurred earlier (S82). Then, a second measurement result report which includes the detected CGI of the CSG1 and the PCI of the CSG2 the transmission of which was delayed at step 81 is created (S83), and the second measurement result report is transmitted to the eNB of the serving cell (S84).

According to the terminal device 1 of the first embodiment of the present invention, it is possible to prevent measurement result reports from being frequently transmitted from the terminal device 1 (UE) to the macrocell base station (eNB). Thus, it is possible to control waste of wireless resources, prevent detection of a CGI from being frequently performed and prevent communication interruption from frequently occurring.

The terminal device 1 of this embodiment is provided with: a trigger judging section 6 judging, on the basis of a result of comparison between the reception quality of a macrocell and the reception quality of a CSG cell in the macrocell, whether an event trigger for performing handover from the macrocell to the CSG cell has occurred or not; a first measurement result reporting section 7 transmitting a first measurement result report which includes a physical cell ID (PCI) indicating a CSG cell for which the event trigger has occurred, to a base station of the macrocell; a CGI detecting section 9 detecting a proper cell ID (CGI) for uniquely identifying the CSG cell for which the event trigger has occurred, on the basis of measurement setting information transmitted from the base station of the macrocell as a response to the first measurement result report; a second measurement result reporting section 10 transmitting a second measurement result report which includes the detected CGI, to the base station of the macrocell; and a report transmission controlling section 13 controlling, on the basis of the reception quality of a first CSG cell for which an event trigger has occurred earlier and the reception quality of a second CSG cell for which an event trigger has occurred later, transmission of the first and second measurement result reports of the first and second CSG cells so as to reduce the frequency of transmission of the measurement result reports when the event triggers have continuously occurred.

According to this configuration, if event triggers for performing handover from the macrocell to a CSG cell have continuously occurred, report transmission control is performed to reduce the frequency of transmission of a measurement result report on the basis of the reception qualities of a CSG cell for which an event trigger has occurred earlier (a first CSG cell) and a CSG cell for which an event trigger has occurred later (a second CSG cell). Thus, it is possible to prevent measurement result reports from being frequently transmitted from the terminal device 1 to the macrocell base station and control waste of wireless resources. In this case, as frequent transmission of a second measurement result report is suppressed, frequent detection of a CGI is also prevented. Therefore, it is possible to prevent communication interruption from being frequently caused to detect a CGI.

In this embodiment, the report transmission controlling section 13 may perform control to cancel transmission of the second measurement result report of the first CSG cell and prioritize transmission of the second measurement result report of the second CSG cell if the reception quality of the second CSG cell is higher than the reception quality of the first CSG cell, and perform control to delay transmission of the first measurement result report of the second CSG cell and transmit the second measurement result report of the first CSG cell and the first measurement result report of the second CSG cell together if the reception quality of the second CSG cell is lower than the reception quality of the first CSG cell.

According to this configuration, if the reception quality of a CSG cell for which an event trigger has occurred later (a second CSG cell) is higher, transmission of a second measurement result report of a CSG cell for which an event trigger has occurred earlier (a first CSG cell) is cancelled, and transmission of a second measurement result report of the CSG cell with the higher reception quality (the second CSG cell) is prioritized. Thereby, it is possible to reduce transmission of an unnecessary measurement result report and transmit a necessary measurement result report immediately.

On the other hand, if the reception quality of the CSG cell for which the event trigger has occurred later (the second CSG cell) is lower, transmission of a first measurement result report of the CSG cell (the second CSG cell with the lower reception quality) is delayed and transmitted together with the second measurement result report of the CSG cell for which the event trigger has occurred earlier (the first CSG cell). Thereby, it is possible to reduce transmission of an unnecessary measurement result report.

The terminal device 1 of this embodiment is provided with: a fingerprint information storing section 4 which stores cell information about CSG cells detected in the past (fingerprint information), which is information about accessibility to the CSG cells, and a condition judging section 14 judging whether a CSG cell for which an event trigger has occurred is accessible or not on the basis of the cell information. The report transmission controlling section 13 may control transmission of the first and second measurement result reports of the first and second CSG cells on the basis of a result of judgment about whether the first and second CSG cells are accessible or not.

According to this configuration, if event triggers for performing handover from the macrocell to a CSG cell have continuously occurred, report transmission control is performed to reduce the frequency of transmission of a measurement result report on the basis of a result of judgment about whether a CSG cell for which an event trigger has occurred earlier (a first CSG cell) and a CSG cell for which an event trigger has occurred later (a second CSG cell) are accessible or not (an access condition). Thus, it is possible to prevent measurement result reports from being frequently transmitted from the terminal device 1 to the macrocell base station and control waste of wireless resources. In this case also, as frequent transmission of a second measurement result report is suppressed, frequent detection of a CGI is also prevented. Therefore, it is possible to prevent communication interruption from being frequently caused to detect a CGI.

In this embodiment, the report transmission controlling section 13 may perform control to cancel transmission of the second measurement result report of the first CSG cell and prioritize transmission of the second measurement result report of the second CSG cell if the first CSG cell is accessible or accessibility thereof is unknown, the second CSG cell is accessible, and the reception quality of the second CSG cell is higher than the reception quality of the first CSG cell, or if the first CSG cell is inaccessible, and the second CSG cell is accessible, and perform control to delay transmission of the first measurement result report of the second CSG cell and transmit the second measurement result report of the first CSG cell and the first measurement result report of the second CSG cell together if the first CSG cell is accessible or accessibility thereof is unknown, the second CSG cell is accessible, and the reception quality of the second CSG cell is lower than the reception quality of the first CSG cell, or if the first CSG cell is accessible or accessibility thereof is unknown, and the second CSG cell is inaccessible or accessibility thereof is unknown, or if the first CSG cell is inaccessible, and the second CSG cell is inaccessible or accessibility thereof is unknown.

According to this configuration, if the access condition of a CSG cell for which an event trigger has occurred later (a second CSG cell) is better, transmission of a second measurement result report of a CSG cell for which an event trigger has occurred earlier (a first CSG cell) is cancelled, and transmission of a second measurement result report of the CSG cell with the better access condition (the second CSG cell) is prioritized. Thereby, it is possible to reduce transmission of an unnecessary measurement result report and transmit a necessary measurement result report immediately.

On the other hand, if the access condition of the CSG cell for which the event trigger has occurred later (the second CSG cell) is worse, transmission of a first measurement result report of the CSG cell (the second CSG cell with the worse access condition) is delayed and transmitted together with the second measurement result report of the CSG cell for which the event trigger has occurred earlier (the first CSG cell). Thereby, it is possible to reduce transmission of an unnecessary measurement result report.

In this embodiment, the report transmission controlling section 13 is able to cancel transmission of the second measurement result report of the first CSG cell before a predetermined timer time set when the earliest event trigger among the event triggers which have continuously occurred elapses, and the timer time may be set according to the reception quality of the macrocell.

According to this configuration, if event triggers for performing handover from the macrocell to a CSG cell have continuously occurred, transmission of a measurement result report is not cancelled after the timer time set when the earliest event trigger occurred elapses. Thereby, it is possible to prevent occurrence of a phenomenon that transmission of a measurement result report is kept being cancelled. The timer time is appropriately set according to the reception quality of the macrocell.

In this embodiment, the timer time may be set to be infinite if the reception quality of the macrocell is higher than a predetermined threshold, and set to be a finite time notified from the base station of the macrocell if the reception quality of the macrocell is lower than the threshold.

According to this configuration, if the reception quality of the macrocell is high, the necessity of performing handover immediately is low, and therefore, the timer time is set to be infinite. On the other hand, if the reception quality of the macrocell is low, it is desirable to perform handover as soon as possible, and therefore, appropriate timer time notified from the base station of the macrocell (finite timer time) is set. For example, as the reception quality of the macrocell is lower, the timer is set shorter.

In this embodiment, the timer time may be notified to each of multiple terminal devices 1 individually from the base station of the macrocell.

According to this configuration, the timer time is notified to each of the multiple terminal devices 1 individually from the base station of the macrocell. Thereby, it is possible to set timer time for each of the terminal devices 1 individually. This notification method is suitable for the case where the number of the terminal devices 1 is small. For example, by making notifications for the terminal devices 1 individually using measurement setting messages, the amount of notification information can be reduced in comparison with the case of making notifications simultaneously (simultaneous broadcasting) using notification information.

In this embodiment, the timer time may be notified to the multiple terminal devices 1 from the base station of the macrocell simultaneously.

According to this configuration, the timer time is notified to the multiple terminal devices 1 from the base station of the macrocell simultaneously. Thereby, it is possible to easily set common timer time for all the terminal devices 1. This notification method is suitable for the case where the number of the terminal devices 1 is large. For example, by making notifications simultaneously using notification information, the amount of measurement setting messages can be reduced in comparison with the case of making notifications individually using measurement setting information messages.

Second Embodiment

Next, a terminal device of a second embodiment of the present invention will be described. Here, description will be made mainly on points in which the terminal device of the second embodiment is different from the first embodiment. The components and operations of this embodiment are similar to those of the first embodiment unless especially otherwise referred to.

Figure 9:
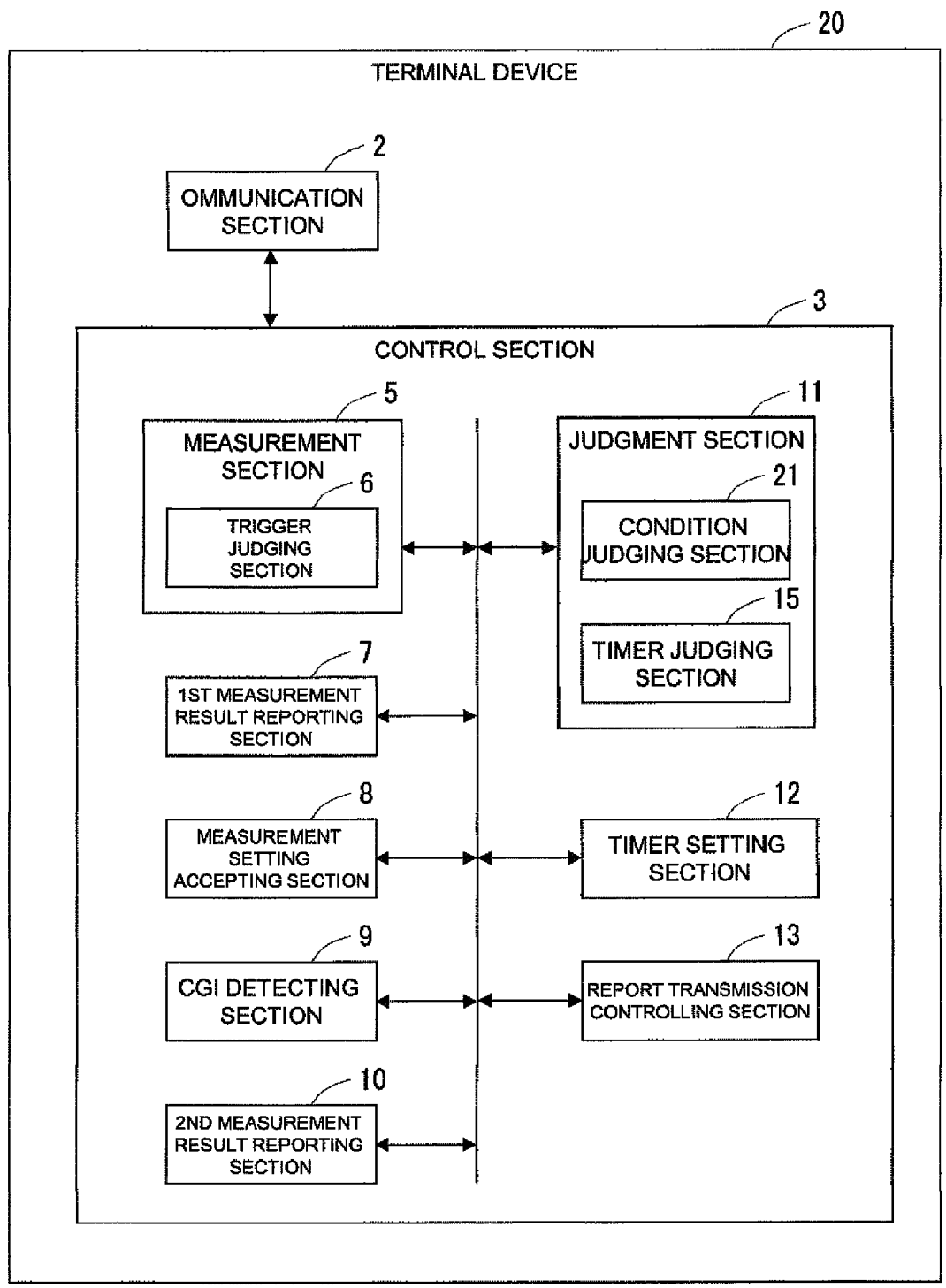
FIG. 9 is a block diagram showing the configuration of a terminal device of a second embodiment of the present invention.

FIG. 9 is a block diagram showing the configuration of the terminal device of this embodiment. A terminal device 20 of this embodiment is equipped with a function of using finger print information. Therefore, the terminal device 20 is not provided with the fingerprint information storing section 4 for holding fingerprint information. A condition judging section 21 of this embodiment judges whether a predetermined condition to be a criteria at the time of performing measurement result report transmission control is satisfied or not only on the basis of the reception quality of a CSG cell for which an event trigger has occurred. Specifically, the condition judging section 21 judges whether a condition 2-1 that "the reception quality of a second CSG cell is higher than the reception quality of a first CSG cell", for CSG cells for which event triggers have continuously occurred.

The operation of the terminal device 20 configured as described above will be described with reference to drawings.

Figure 10:
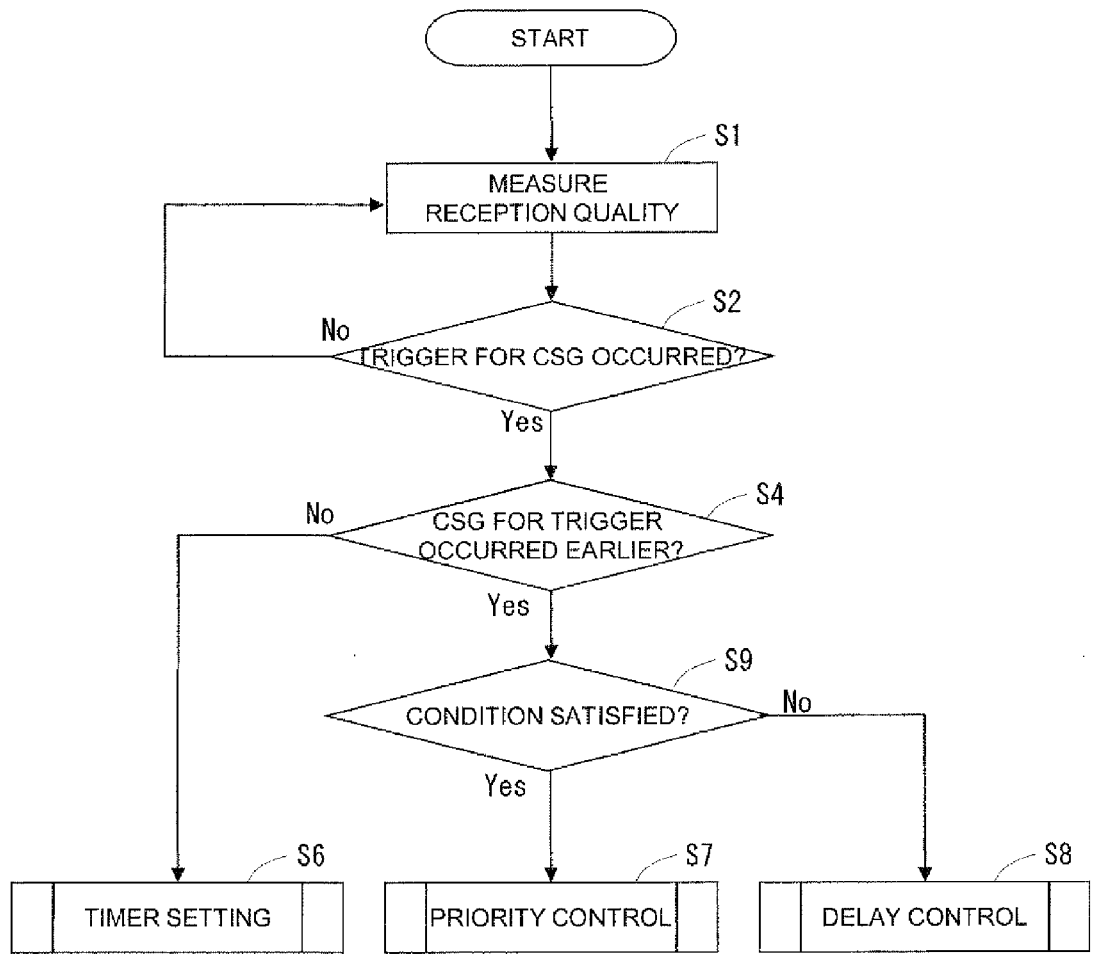
FIG. 10 is a flowchart showing the flow of the whole operation of the terminal device in the second embodiment of the present invention.
Figure 11:
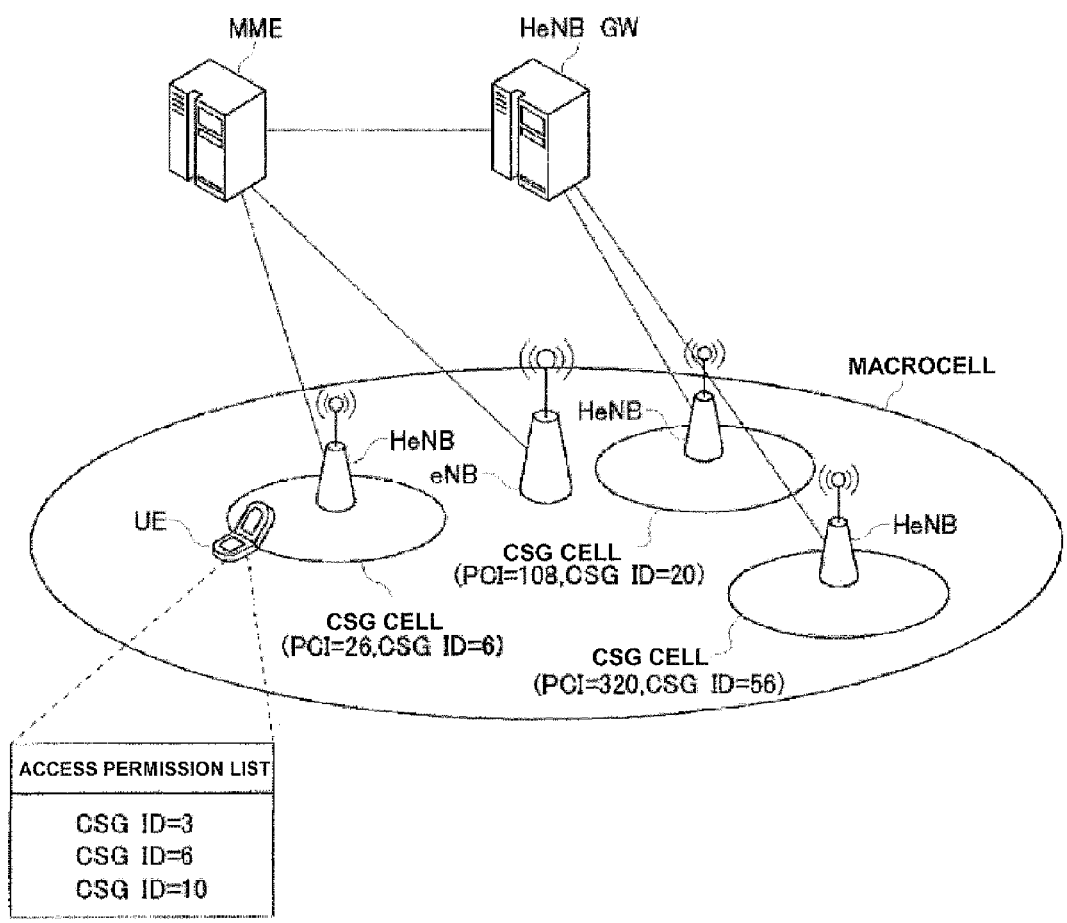
FIG. 11 is a diagram showing the configuration of a macrocell and CSG cells.
Figure 12:
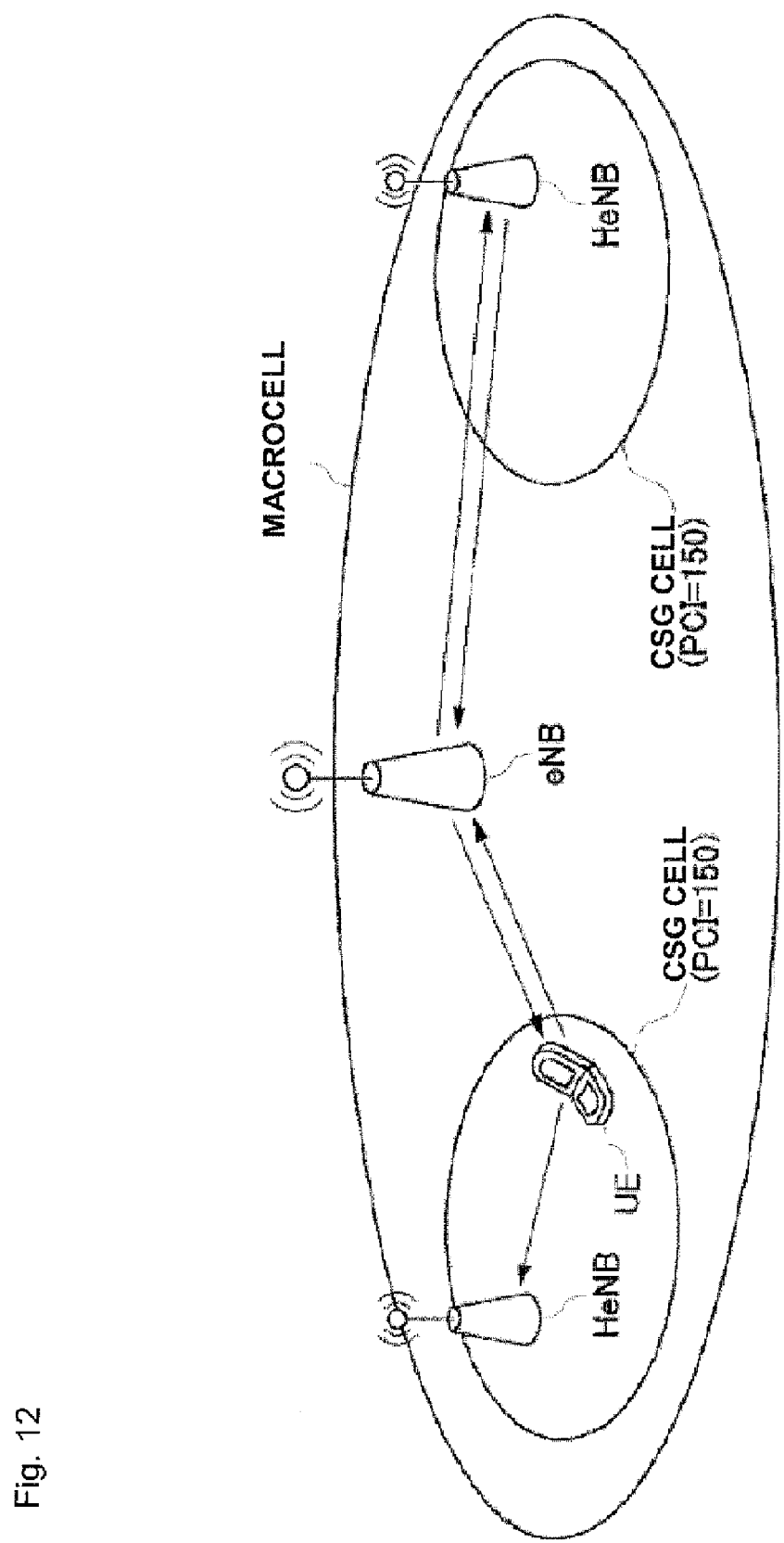
FIG. 12 is a diagram illustrating PCI collision and PCI confusion.
Figure 13:
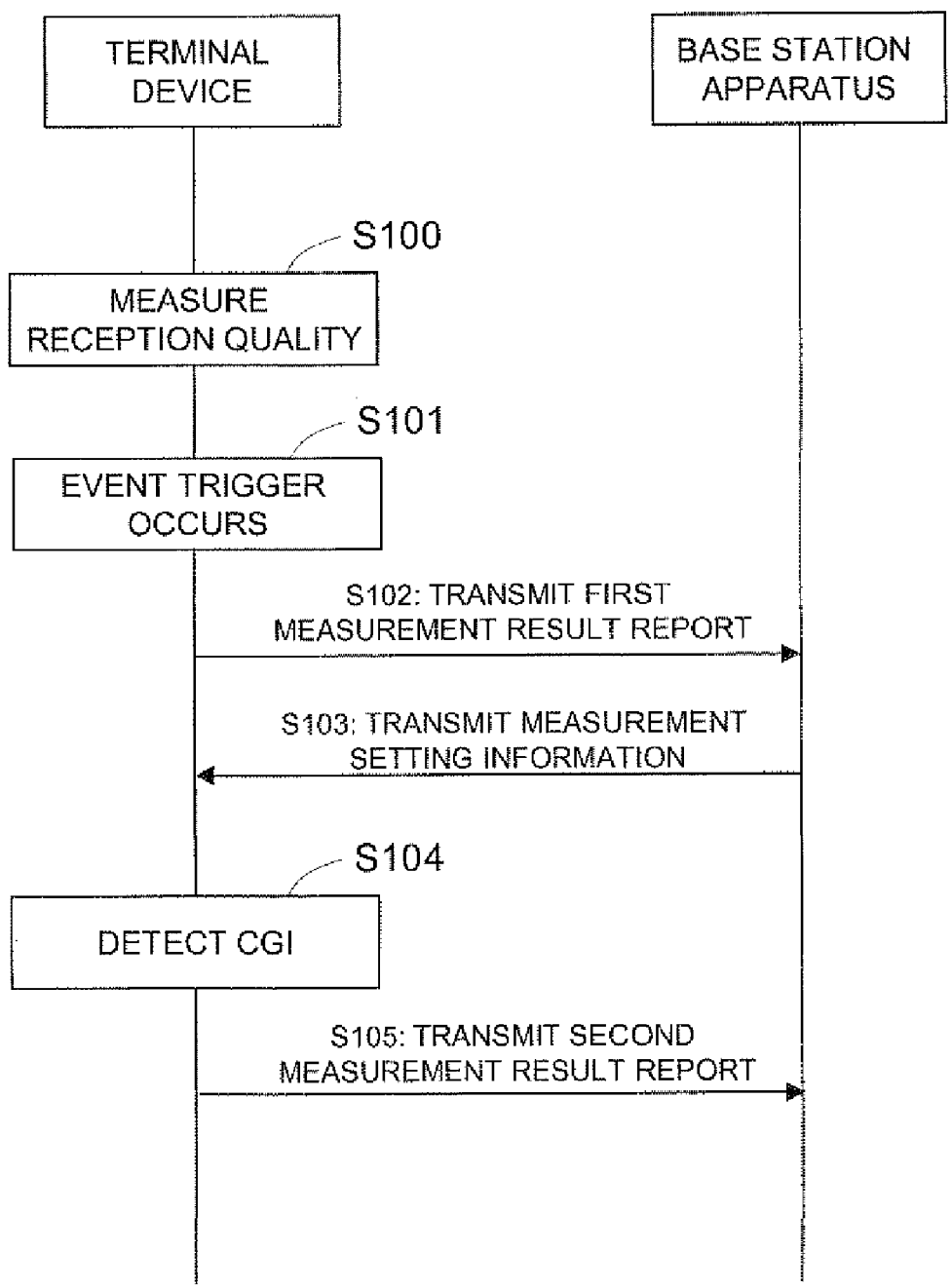
FIG. 13 is a sequence diagram of conventional measurement result report transmission control as a measure for PCI confusion.
Figure 14:
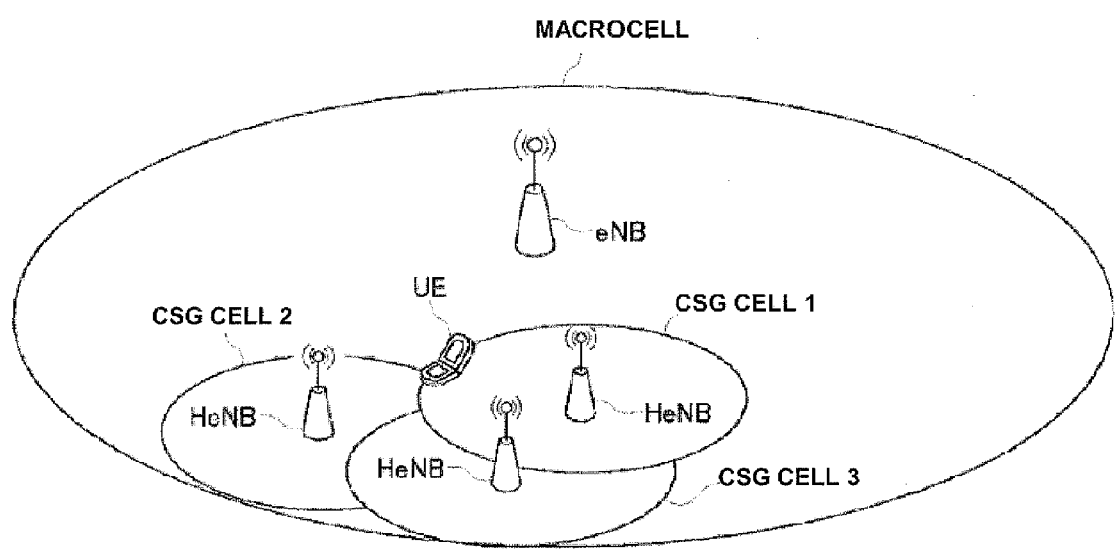
FIG. 14 is a diagram showing an example of arrangement of the terminal device, a macrocell base station and CSG cell base stations.
Figure 15:
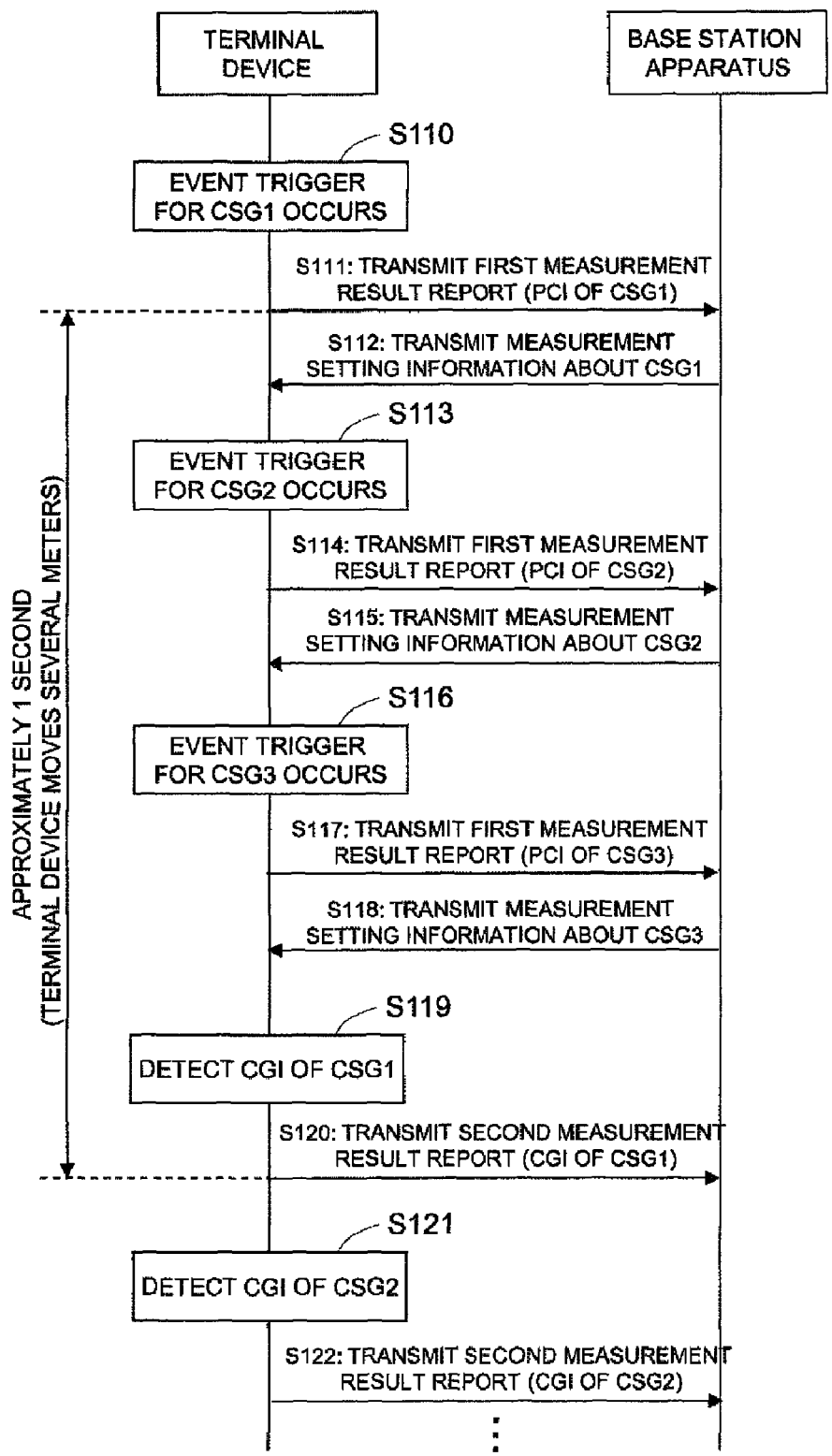
FIG. 15 is a sequence diagram of conventional measurement result report transmission control performed when event triggers have continuously occurred.

FIG. 10 is a flowchart showing the whole flow of the process of the terminal device 20. As shown in FIG. 10, the terminal device 20 measures the reception quality of the macrocell and the reception qualities of surrounding CSG cells (S1) and judges whether event triggers for handover to the CSG cells have occurred or not, on the basis of a result of comparison between the reception qualities (S2).

If it is judged that an event trigger for a CSG cell has occurred, it is judged whether or not there is a CSG cell for which an event trigger has occurred earlier (S4). If an event trigger has occurred earlier, it is judged whether the above condition 2-1 is satisfied or not (S9).

Then, if an event trigger has not occurred earlier, a timer setting process is performed (S6). If it is judged that the condition 2-1 is satisfied, control to prioritize transmission of a second measurement result report of the CSG cell (CSG2) for which the event trigger has occurred later is performed (S7). On the other hand, if it is judged that the condition 2-1 is not satisfied, control to delay transmission of the first measurement result report of the CSG cell (CSG2) for which the event trigger has occurred later is performed (S8).

According to the terminal device 20 of the second embodiment of the present invention also, the operation and advantages similar to those of the first embodiment can be obtained.

That is, in the terminal device 20 of this embodiment also, if event triggers for performing handover from the macrocell to a CSG cell have continuously occurred, report transmission control is performed to reduce the frequency of transmission of a measurement result report on the basis of the reception qualities of a CSG cell for which an event trigger has occurred earlier (a first CSG cell) and a CSG cell for which an event trigger has occurred later (a second CSG cell). Thus, it is possible to prevent measurement result reports from being frequently transmitted from the terminal device 20 to the macrocell base station and control waste of wireless resources. In this case, as frequent transmission of a second measurement result report is suppressed, frequent detection of a CGI is also prevented. Therefore, it is possible to prevent communication interruption from being frequently caused to detect a CGI.

The embodiments of the present invention have been described above as examples. The scope of the present invention is not limited thereto and can be modified or varied according to purposes within the range described in claims.

Preferable embodiments of the present invention conceivable at the present time have been described. It is intended that: it should be understood that various variations of the embodiments are possible; and accompanying Claims include all such variations within the true spirit and scope of the present invention.

INDUSTRIAL APPLICABILITY

As described above, the terminal device according to the present invention has advantages of capable of controlling waste of wireless resources and capable of preventing communication interruption from frequently occurring, and it is useful to be used as a mobile phone, a mobile terminal device (PDA) and the like.

REFERENCE SIGNS LIST 1 terminal device (first embodiment)
4 fingerprint information storing section
5 measurement section
6 trigger judging section
7 first measurement result reporting section
8 measurement setting accepting section
9 CGI detecting section
10 second measurement result reporting section
11 judgment section
12 timer setting section
13 report transmission controlling section
14 condition judging section
15 timer judging section
20 terminal device (second embodiment)
21 condition judging section

The invention claimed is:

1. A terminal device comprising:
a trigger judging section judging, on the basis of a result of comparison between a reception quality of a macrocell and a reception quality of a small cell in the macrocell, whether an event trigger for performing handover from the macrocell to the small cell has occurred or not;
a first measurement result reporting section transmitting a first measurement result report which includes a physical cell ID indicating a small cell for which the event trigger has occurred, to a base station of the macrocell;
a proper cell ID detecting section detecting a proper cell ID for uniquely identifying the small cell for which the event trigger has occurred, on the basis of measurement setting information transmitted from the base station of the macrocell as a response to the first measurement result report;

a second measurement result reporting section transmitting a second measurement result report which includes the detected proper cell ID, to the base station of the macrocell; and a report transmission controlling section controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred, wherein:

the report transmission controlling section performs control to cancel transmission of the second measurement result report of the first small cell and prioritize transmission of the second measurement result report of the second small cell in the event that the reception quality of the second small cell is higher than the reception quality of the first small cell, and performs control to delay transmission of the first measurement result report of the second small cell and transmit the second measurement result report of the first small cell and the first measurement result report of the second small cell together in the event that the reception quality of the second small cell is lower than the reception quality of the first small cell.

2. The terminal device according to claim 1, comprising:

a cell information storing section storing cell information about small cells detected in the past, which is information about accessibility to the small cells; and a condition judging section judging whether the small cell for which the event trigger has occurred is accessible or not on the basis of the cell information; wherein the report transmission controlling section controls transmission of the first and second measurement result reports of the first and second small cells on the basis of a result of judgment about whether the first and second small cells are accessible or not.

3. The terminal device according to claim 1, wherein the report transmission controlling section performs control to cancel transmission of the second measurement result report of the first small cell and prioritize transmission of the second measurement result report of the second small cell in the event that the first small cell is accessible or accessibility thereof is unknown, the second small cell is accessible, and the reception quality of the second small cell is higher than the reception quality of the first small cell, or in the event that the first small cell is inaccessible, and the second small cell is accessible, and performs control to delay transmission of the first measurement result report of the second small cell and transmit the second measurement result report of the first small cell and the first measurement result report of the second small cell together in the event that the first small cell is accessible or accessibility thereof is unknown, the second small cell is accessible, and the reception quality of the second small cell is lower than the reception quality of the first small cell, or in the event that the first small cell is accessible or accessibility thereof is unknown, and the second small cell is inaccessible or accessibility thereof is unknown, or in the event that the first small cell is inaccessible, and the second small cell is inaccessible or accessibility thereof is unknown.

4. The terminal device according to claim 1, wherein the report transmission controlling section is able to cancel transmission of the second measurement result report of the first small cell before a predetermined timer time set when the earliest event trigger among the event triggers which have continuously occurred elapses; and the timer time is set according to the reception quality of the macrocell.

5. The terminal device according to claim 4, wherein the timer time is set to be infinite in the event that the reception quality of the macrocell is higher than a predetermined threshold, and is set to be a finite time notified from the base station of the macrocell in the event that the reception quality of the macrocell is lower than the threshold.

6. The terminal device according to claim 5, wherein the timer time is notified to each of the multiple terminal devices individually from the base station of the macrocell.

7. The terminal device according to claim 5, wherein the timer time is notified to the multiple terminal devices from the base station of the macrocell simultaneously.

8. A wireless communication system comprising a terminal device possessed by a user and a base station apparatus installed in a base station of a macrocell, wherein the terminal device comprises:

a trigger judging section judging, on the basis of a result of comparison between a reception quality of the macrocell and a reception quality of a small cell in the macrocell, whether an event trigger for performing handover from the macrocell to the small cell has occurred or not;

a first measurement result reporting section transmitting a first measurement result report which includes a physical cell ID indicating a small cell for which the event trigger has occurred, to a base station apparatus of the macrocell;

a proper cell ID detecting section detecting a proper cell ID for uniquely identifying the small cell for which the event trigger has occurred, on the basis of measurement setting information transmitted from the base station apparatus of the macrocell as a response to the first measurement result report;

a second measurement result reporting section transmitting a second measurement result report which includes the detected proper cell ID, to the base station apparatus of the macrocell; and a report transmission controlling section controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred, wherein:

the report transmission controlling section performs control to cancel transmission of the second measurement result report of the first small cell and prioritize transmission of the second measurement result report of the second small cell in the event that the reception quality of the second small cell is higher than the reception quality of the first small cell, and performs control to delay transmission of the first measurement result report of the second small cell and transmit the second measurement result report of the first small cell and the first measurement result report of the second small cell together in the event that the reception quality of the second small cell is lower than the reception quality of the first small cell.

9. A wireless communication method comprising:

judging, on the basis of a result of comparison between a reception quality of a macrocell and a reception quality of a small cell in the macrocell, whether an event trigger for performing handover from the macrocell to the small cell has occurred or not;

transmitting a first measurement result report which includes a physical cell ID indicating a small cell for which the event trigger has occurred, to a base station of the macrocell;

detecting a proper cell ID for uniquely identifying the small cell for which the event trigger has occurred, on the basis of measurement setting information transmitted from the base station of the macrocell as a response to the first measurement result report;

transmitting a second measurement result report which includes the detected proper cell ID, to the base station of the macrocell; and controlling, on the basis of a reception quality of a first small cell for which an event trigger has occurred earlier and a reception quality of a second small cell for which an event trigger has occurred later, transmission of the first and second measurement result reports of the first and second small cells so as to reduce the frequency of transmission of the measurement result reports when the event triggers have continuously occurred, wherein:

the controlling includes performing control to cancel transmission of the second measurement result report of the first small cell and prioritize transmission of the second measurement result report of the second small cell in the event that the reception quality of the second small cell is higher than the reception quality of the first small cell, and performing control to delay transmission of the first measurement result report of the second small cell and transmit the second measurement result report of the first small cell and the first measurement result report of the second small cell together in the event that the reception quality of the second small cell is lower than the reception quality of the first small cell.

* * * * *